Feb. 18, 1958  C. R. TAYLOR  2,823,768
LUBRICATOR
Filed March 26, 1953  3 Sheets-Sheet 1
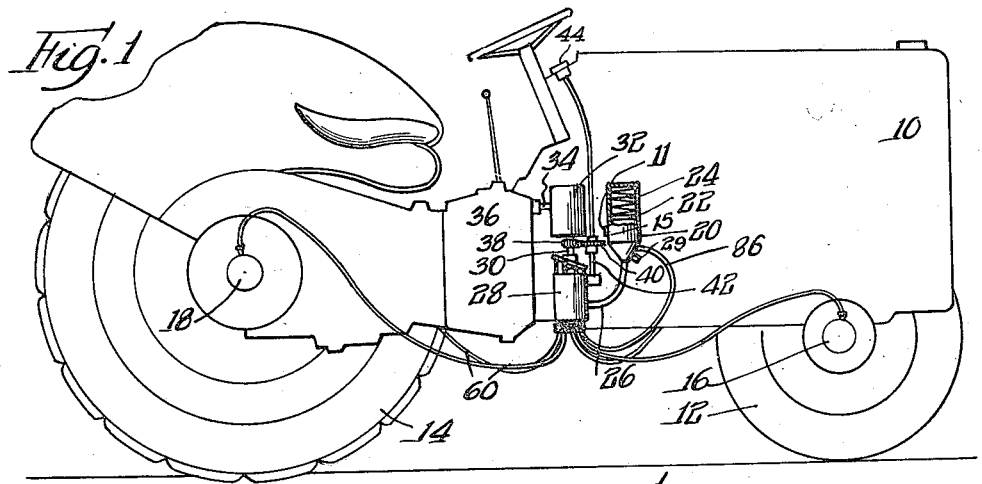
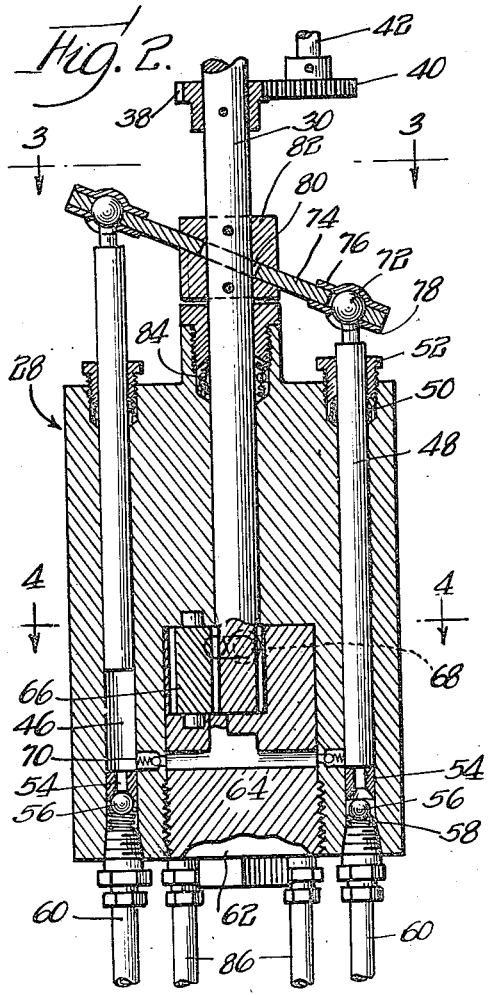
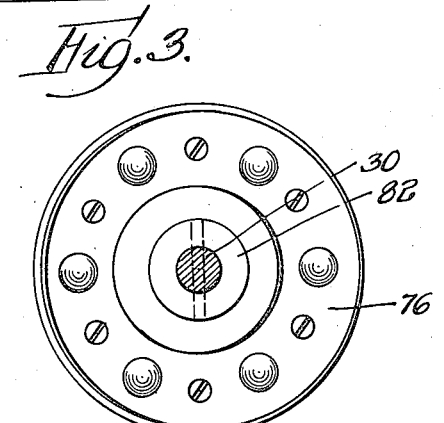
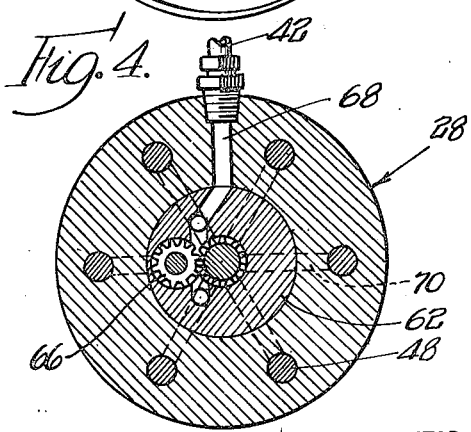
INVENTOR.
Charles Ralph Taylor
BY
Moore, Olson & Trexler
Attys Feb. 18, 1958 C. R. TAYLOR 2,823,768
LUBRICATOR
Filed March 26, 1953 3 Sheets-Sheet 2
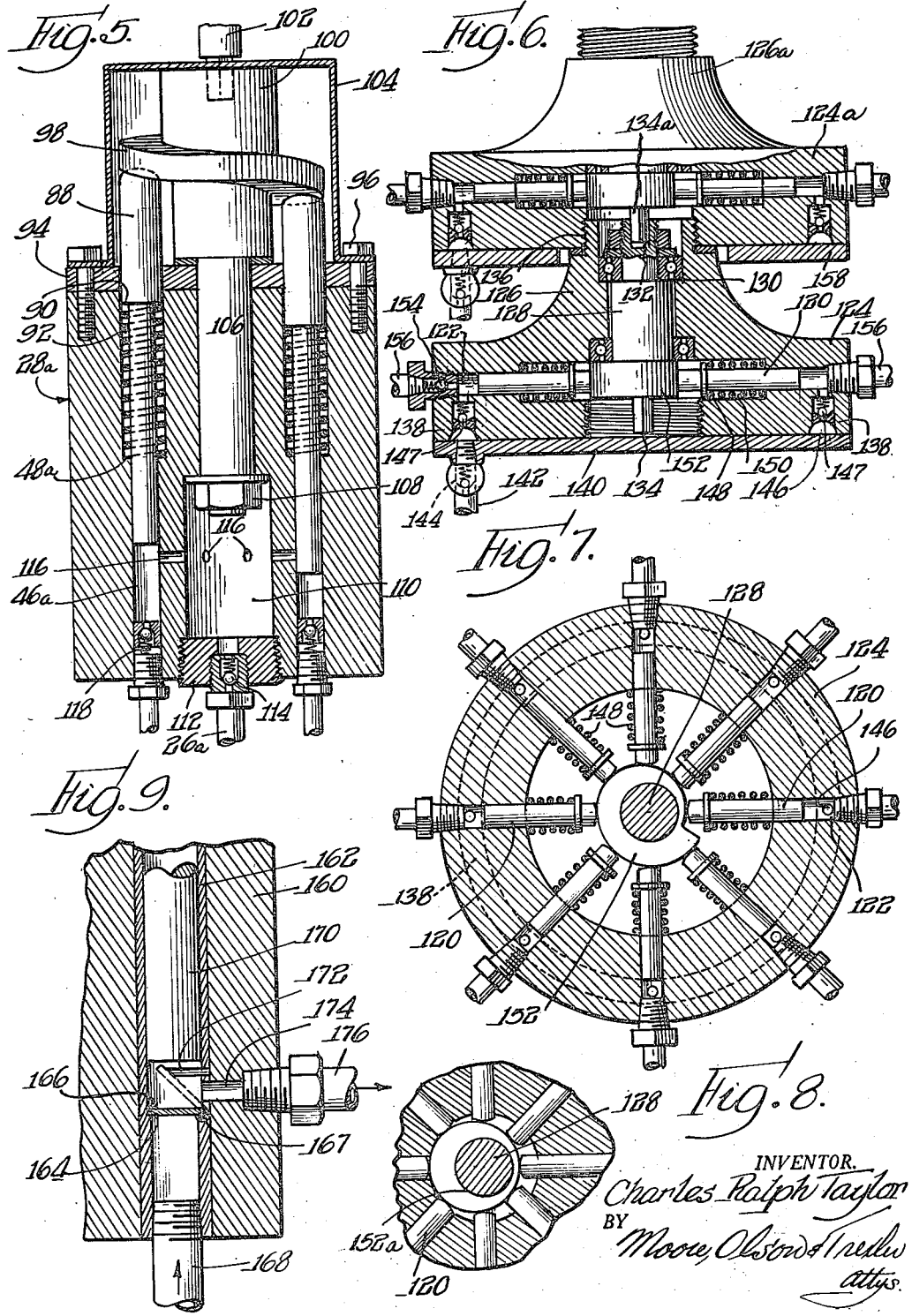
INVENTOR.
Charles Ralph Taylor
BY
Moore, Olstad & Tredlu
attys.

Feb. 18, 1958 C. R. TAYLOR 2,823,768
LUBRICATOR
Filed March 26, 1953 3 Sheets-Sheet 3
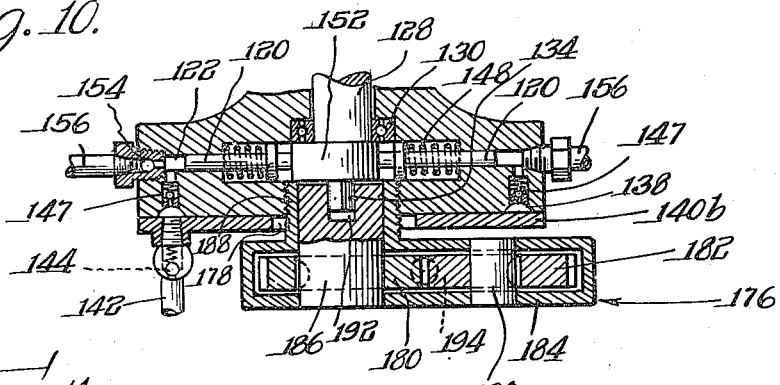
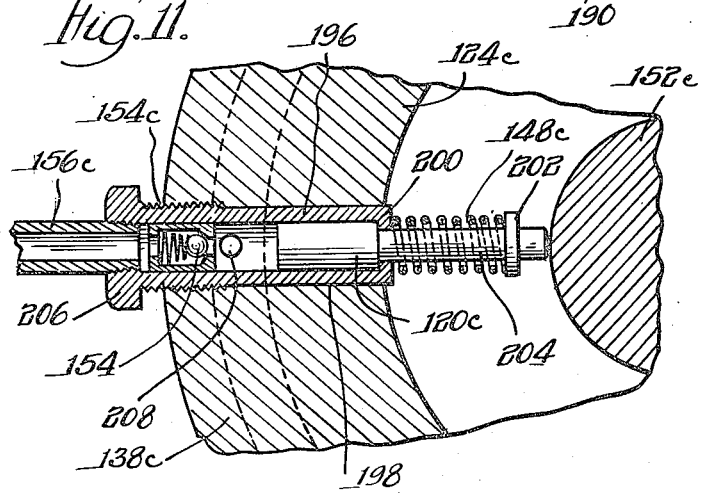
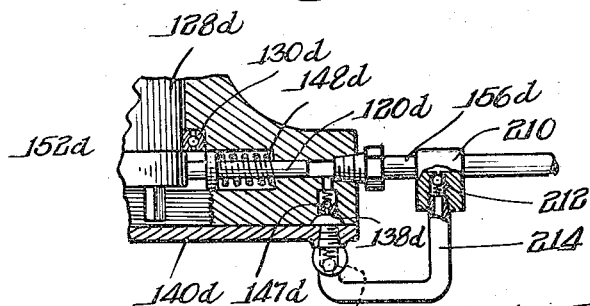
INVENTOR.
Charles Ralph Taylor
BY
Moore, Olson & Trexler
Attys

2,823,768
LUBRICATOR

Charles R. Taylor, Scott City, Kans.

Application March 26, 1953, Serial No. 344,707

9 Claims. (Cl. 184—7)

The present invention relates to new and useful improvements in lubricating means and more particularly to improvements in lubricating systems for vehicles of various types.

More specifically, the invention contemplates the provision of a lubricating system for general use for farm machinery, road construction equipment, oil field equipment, et cetera, and more particularly adapted for use with automotive equipment wherein various operating parts disposed at different locations should be periodically supplied with lubricant or grease during operation of the vehicle. This periodic and repeated replenishment of lubricant to the various operating parts of vehicles is particularly important in tractors and other heavy duty equipment in order to protect the various operating parts against damage due to lack of proper lubrication.

An object of the present invention is to provide new or improved lubricating means adapted automatically to supply lubricant to the various operating parts during operation of the vehicle from a single master station.

In supplying grease to various moving parts for lubricating the same, the utmost care must be taken to exclude air from the grease as air bubbles can prevent grease from properly reaching the moving parts. This is of particular importance when supplying grease to the moving parts from a distant supply station, as in this invention, where the cumulative effect of a series of air bubbles in a supply line could completely halt lubrication at any given point.

An object of this invention is to provide a lubrication system supplying grease or the like from a single master station to a plurality of bearings or other remote stations wherein the entire system is pressurized for air-free feeding of grease.

More particularly, it is an object of this invention to provide a pressurized grease reservoir for a lubrication system as hereinbefore set forth adapted for pressure loading at an automobile service station or the like and positively eliminating the possibility of air in the grease.

Another object of this invention is to provide a lubrication system having a pressurized grease reservoir adapted to be mounted at any convenient, accessible position on a vehicle for supplying grease to a master distributing station located at any position on the vehicle relative to the reservoir.

This invention contemplates the distribution of grease from a master station by means of pistons which positively supply measured amounts of grease with each reciprocation. Different types of vehicles, such as tractors and hayloaders, have different numbers of bearings and corresponding grease fittings, and different ones of these bearings require different amounts of grease.

An object of this invention is to provide a lubrication system of the type heretofore set forth wherein the master distributor is adapted to supply different numbers of bearings and to supply different amounts of lubricant to different bearings.

More particularly, it is an object of this invention to provide a lubricant distributor unit of standard size and design, a plurality of which units can be operatively stacked together for supplying any desired number of bearings.

Another specific object of this invention is to provide a lubricant distributor having readily replaceable pistons and cylinders for supplying different amounts of grease to different bearings.

Yet another object of this invention is to provide a standard lubricant distributor unit and a lubricant pump, one or more of such units being adapted to be stacked together with said lubricant pump to serve varying lubricant requirements.

Other and further objects of the present invention will be apparent from the following description when taken in connection with the accompanying drawings, wherein:

Figure 1 is a schematic side elevation showing a convenient location of the lubricating system on a tractor;

Figure 2 is an enlarged longitudinal sectional view through the lubricant pumping means shown in Figure 1;

Figure 3 is a sectional view taken substantially along the line 3—3 of Figure 2;

Figure 4 is a sectional view taken substantially along the line 4—4 of Figure 2;

Figure 5 is a longitudinal sectional view, similar to Figure 2, but showing a modified form of pump mechanism and driving means therefor;

Figure 6 is a longitudinal sectional view showing a radial type of lubricant pumping mechanism with two pumping units assembled together;

Figure 7 is a transverse sectional view through one of the connected pumping elements of Figure 6;

Figure 8 is a fragmentary transverse section similar to Figure 7, but showing a continuous cam for operating the radially disposed pistons;

Figure 9 is a still further enlarged fragmentary longitudinal sectional view showing a modified form of valve mechanism for controlling passage of lubricant from the supply container to the parts to be lubricated and also showing a replaceable sleeve insert within which the pump piston operates;

Figure 10 is a sectional view somewhat similar to Figure 6 and showing the stacking of a lubricant pump with a distributor unit;

Figure 11 is a greatly enlarged sectional view showing a replaceable piston and cylinder; and Figure 12 is a sectional view generally similar to Figure 6 and showing a by-pass arrangement that may be used in certain installations.

Referring more in detail to the accompanying drawings and particularly to Figure 1 at this time, there is diagrammatically shown a tractor type of vehicle having a body portion 10 supported on front and rear wheels 12, 14 carried respectively by front and rear axles 16, 18 having bearings which are required to be lubricated during operation of the tractor, it being understood, of course, that other parts requiring lubrication are also to be supplied by the present lubricating system. Conveniently mounted within the hood of the tractor so as not to interfere with normal operation thereof is the lubricant supply system. This system includes generally a lubricant reservoir or grease supply container 20 having a plunger plate 22 disposed therein and normally forced downwardly by a relatively heavy spring 24, thus tending to normally force the lubricant through a delivery conduit 26 to the pumping mechanism within the housing 28. Pressure filling of the reservoir 20 is accomplished by means of a conventional fitting 29 at any garage or service station, and the pressure loading allows the reservoir to be mounted at any convenient and accessible position on the vehicle, which may be remote from the pumping mechanism if desired. The pumping mechanism must, of course, be driven at a speed greatly reduced from that of the engine R. P. M. and for this purpose the drive shaft 30 for the pumping mechanism is connected through suitable speed reducing means (not shown) with a housing 32 to a shaft 34 which is driven from the transmission 36 of the tractor. The pump driving shaft 30 has a speed reducing gear 38 in mesh with a larger gear 40 mounted on an auxiliary shaft 42 and this shaft may be connected through suitable flexible shafting to an indicator 44 located on the vehicle instrument panel to indicate on a suitably calibrated dial either the number of revolutions made by the shaft or the number of hours the tractor has been run. The combination of one or both of these indications may be used to indicate the approximate amount of grease left in the supply container or it may be merely used to indicate the extent of use to which the tractor has been put over a period of time. As an alternative, an electric circuit to a visible indicator 11 may be closed by contact of the plate-type plunger 22 within the supply container with suitable contacts 15, thus also indicating when the supply of grease within the container has been depleted to a predetermined extent.

The pumping mechanism within the housing 28 in Figure 1 will now be described in detail, reference being had to Figures 2, 3 and 4 of the accompanying drawings. This housing is in the form of a solid block having spaced longitudinal bores 46 therethrough, these bores being located adjacent the outer periphery thereof. There is a central bore to receive the drive shaft 30 for the pumping mechanism and the peripherally spaced bores 46 receive a similar number of pump pistons or plungers 48 which at the upper ends thereof reciprocate within fluid-tight packings 50 which may be conveniently compressed by packing followers 52. The lower ends of the bores for the pump pistons are each controlled by a one-way check valve, each including a valve seat 54 against which a ball or similar valve 56 is upwardly urged by coil springs 58. Each of these valves controls the passage of lubricant to distributing conduits 60 which lead to suitable grease fittings at the various parts to be lubricated and only permit passage of lubricant thereby upon downward movement of a corresponding piston.

The central portion of the housing or casing 28 is recessed to threadedly receive a block 62 providing an internal manifolding recess 64 and carrying at the upper end thereof a pair of rotary gear type intermeshing pumping elements 66, one of which is driven by the drive shaft. The entering side of the rotary pumping gears communicates through a passage 68 with the supply conduit 26 which is connected to the bottom of the grease supply container 20 and the delivery side of the rotary pumping elements is in communication with the internal chamber 64. This internal chamber is in communication with the various peripherally spaced bores 46 through ball valve controlled, radial passages 70 so that lubricant delivered thereto can, depending upon the operation of the respective pistons, be passed radially outward into the bores 46 from which the pistons force the same consecutively into one of the distributing conduits 60.

Each of the pistons is provided with a ball shaped outer end 72 disposed in corresponding openings in a wobble plate 74. The ball shaped ends of the pistons are connected to the wobble plate by opposed annular plates 76, 78 suitably shaped to at least partially enclose the ends of the pistons and these plates permit the relative movement necessary for proper transmission of rectilinear motion to the pistons 48 as the wobble plate is caused to move by reason of the diagonally inclined cam slot 80 in the driving collar 82 keyed to the drive shaft 30 which extends through a suitable packing 84.

In the operation of this form of the invention, it will be seen that rotation of the shaft 30 and the cam grooved collar 82 will effect the desired wobbling movement of the wobble plate 74 so as to in turn effect successive reciprocating strokes of the peripherally disposed pump pistons 48. The rotary gear pump constituted by the intermeshing rotary gears 66 is designed, after initial priming, to maintain the chamber 64 completely filled with grease and under sufficient pressure so that each successive piston upon its upward stroke will draw into its corresponding bore a supply of lubricant from the chamber 64 to be forced into a corresponding distributing conduit 60 upon the power stroke of the piston. However, it may be desirable in some instances to effect continuous circulation of the lubricant and this may be particularly desirable in extremely cold weather so that the lubricant will be maintained in a sufficiently fluid state. To this end, the internal chamber 64 may communicate with one or more conduits 86 which in turn lead back to the supply container 20 slightly above the opening thereof into the delivery conduit 26, as shown in Figure 1. With this arrangement, exact proportioning of the displacement of the rotary gear pump with respect to the increments of lubricant withdrawn by each successive operation of one of the pistons need not be accurately determined. The ball valves in the radial passages at all times prevent backflow of lubricant from any one of the bores 46 upon the downward movement of the corresponding piston therein to force the same outwardly through a distributing conduit 60.

In a modified form of the invention, as shown in Figure 5, the peripherally spaced pistons 48a are provided with elongated head portions 88 providing internal shoulders 90 within the bores 46a of the casing 28a and coil springs 92 surround the pistons within the bores and bear against the internal shoulders 90 and a part of the casing so as to normally force the pistons upwardly, as viewed in Figure 5. For purposes of assembly, the casing 28a in this form of the invention is provided with a cover plate 94 which facilitates assembly of the combined springs 92 and pistons 48a and which is secured thereto by securing bolts 96 or the like. The outer ends of the elongated head portions 88 of the pistons are adapted to be engaged by a peripherally undulant cam 98 carried by a driven element 100 suitably connected to the drive shaft or drive cable 102. The driven element 100 and cam are disposed within a suitable housing 104 which is also secured in place by the bolts 96. The driven element 100 carrying the cam 98 is provided with a shank 106 extending through a centrally disposed bore in the casing and rotatably secured thereto by a nut 108 or the like.

In this form of the invention, the rotary gear pump, as described in connection with Figures 2, 3 and 4, is eliminated, and there is provided a central chamber 110 within the casing 28a. This chamber is closed by an apertured plug 112 to which is secured a lubricant supply conduit 26a leading from the bottom of the supply container 20. At the connection between the plug and the supply conduit, there is provided a check valve 114 permitting inward flow of the lubricant to the chamber 110 but preventing movement of the lubricant in a reverse direction. Thus, in this form of the invention, the spring pressed plate-like plunger 22 (see Figure 1) in the supply container 20 is of importance in maintaining sufficient pressure in the supply conduit 26a so that upon the operation to be presently described lubricant will be forced into the central recess which serves as a manifolding or distributing chamber.

Considering the piston shown at the left hand side of

Figure 5 as being at the uppermost limit of its stroke, it is to be noted that the end of the piston is just slightly above one of the radial passages 116 affording communication between the recess 110 and the corresponding bore 46a for the piston. Likewise, the piston at the right hand side of Figure 5 is at a low position on the power stroke thereof and is below a corresponding radial passage 116 so as to seal off communication between the piston bore 46a and the central recess or manifold 110. Thus, it will be seen that upward movement of one of the pistons 48a to its uppermost position will create a vacuum within the bore 46a therefor which vacuum will not be placed in communication with the central supply recess or manifold 110 until the end of the piston passes the corresponding radial passage 116. At that time, the vacuum created beneath that piston will draw the necessary supply of lubricant into the bore 46a and, upon downward movement of the piston, the corresponding radial passage 110 will be closed off so that the lubricant previously drawn into the bore beneath the piston will now be forced past a check valve 118 controlling the lower ends of the bores 46a and into a distributing conduit 60. Upon the passage of lubricant from the central recess 110 into each of the piston bores, the resulting slight reduction of pressure is sufficient for the plate-type plunger 22 in the supply container 20 to force an additional supply of lubricant into the manifolding recess 110.

In the preferred form of the invention shown in Figures 6 and 7, the distributing or pumping means is in the form of a plurality of units each having radially disposed pistons 120 operating within corresponding bores 122 in a suitable casing 124. As illustrated in Figure 6, there may be one or two or more connected pumping units, the number of units determining the number of bearings or the like that can be lubricated. These units all are identical, being of a standard size and design, and the description of one will be sufficient. Each casing, as 124 and 124a, in this form of the invention includes a central upstanding boss portion 126 having a driven stub shaft 128 mounted between suitable bearings 130 and extending vertically or longitudinally of the boss. One end of the driven stub shaft 128 is provided with a non-circular recess 132 and the other end is provided with a similarly shaped central extension 134. Thus, as illustrated, one unit, such as 124a, can be secured immediately above another unit, as 124, with the non-circular extension 134a of the upper shaft element fitting within the correspondingly shaped recess 132 of the lower shaft element to provide a driving connection therebetween. Likewise, the uppermost of the series of shaft sections may be directly connected to the drive shaft. It is to be noted that the boss 126 has a threaded connection 136 with a recess in the upper casing 124a for securing the units together.

Each casing includes around the bottom surface thereof an annular trough or recess 138 which constitutes the lubricant distributing manifold within the casing. Thus, the bottom casing 124, as seen in Figure 6, is provided with a closing plate 140 having one or more openings to which are connected supply conduits 142 leading from the lubricant supply container 20 through a pump as will be disclosed hereinafter. The connections of these supply conduits 142 include check valves 144 permitting passage of the lubricant into the annular manifolding recess 138 but preventing movement of the lubricant outwardly therefrom. In turn, the annular manifolding recess is in communication through a series of vertical passages 146, with corresponding bores 122, each of the passages 146 being provided with a ball check valve 147 to preclude reverse flow. Each piston 120 includes a collar 148 between which and a portion of the casing is disposed a coil spring 150 normally tending to retract the piston. The power stroke movement of each piston is accomplished by means of the interrupted cam element 152 which is carried by and rotates with the driven stub shaft 128. Thus, successive pistons are caused to effect their power stroke which will force lubricant past one-way check valves 154 at the connection of each of the several distributing conduits 156 with a corresponding bore 122 and into the several distributing conduits. Return movement of the pistons 120 from the limits of each power stroke will create sufficient vacuum within the corresponding bores 122 to withdraw the desired amount of lubricant from the annular manifolding recess 138 for the next supply of lubricant to the part or parts to be lubricated. Operation of each of the radial pumping means in this form of the invention is identical but it is to be noted that the closing plate of any upper pumping unit 124a is in the form of an annular plate 158 in order to permit the desired interconnection between adjacent superposed units. Likewise, in place of the interrupted cam, a continuous cam element 152a, as shown in Figure 8, may be mounted on the stub driven shafts to effect the desired reciprocation of the radial pistons.

It is sometimes desirable to eliminate double valves, that is, the oppositely acting check valves of the type employed in the modified forms of the invention shown in Figures 5 and 6 and to this end another type of control valve for each piston is shown in Figure 9. In this form of the invention, the peripherally disposed longitudinal bores in the casing 160 are provided with lining sleeves 162, the lower ends of which are provided with an annular valve seating surface 164 with which a pivoted flap valve 166 pivoted at 167 is adapted to cooperate when in closed position. A supply conduit or branch 168 is connected with the bottom of each sleeve insert, or a manifolding recess may be provided, to afford communication with the lubricant supply container 20 and upward movement of each piston 170 within its corresponding sleeve 162 will create sufficient vacuum, in conjunction with the pressure of the plate-type plunger 22 in the supply container 20, to force lubricant past the flap valve 166 as it is opened. Opening movement of the flap valve is limited by means of a pin 172 to approximately 45° so as to avoid any danger of the lateral distributing passage 174 being closed. Upon downward movement of the piston after reaching its uppermost limit, pressure of the lubricant within the sleeve and acting on the reverse side of the flap valve 166 will again force the valve to a closed position on the seat 164, permitting the lubricant to now be forced out of the passage 174 and into a distributing conduit 176 leading to parts to be lubricated. This action takes place in each of the peripherally disposed pistons 170 which, of course, may be operated by any of the mechanisms hereinbefore described.

It has been noted heretofore that a pump preferably is interposed between the reservoir or container and the distributor units. This makes it possible to use a spring 24 which is not prohibitively heavy and stiff while still insuring adequate pressure on the grease at all times. As shown in Figure 10, such a pump is identified by the numeral 176. The bottom of the distributor unit 124 is in this instance closed by a plate 140b, similar to the plate 140 previously described, but having a central aperture 178 therein. The pump 176 is a gear pump having gears 180 and 182 housed within a casing 184, the driven gear 180 being keyed on a large diameter shaft 186 journaled in the casing 184 and in an extension 188 extending upwardly therefrom, and the second gear 182 being keyed on a shaft 190 rotatably journaled at both ends in the casing. The upward extension 188 is externally threaded and is threaded into the body of the distributor unit 124 in the same manner as a plurality of units would be stacked. The top end of the shaft 186 is provided with a square recess 192 receiving the square extension 134 on the shaft 128 for driving the gear pump 176. The pump 176 is provided with an inlet 194 for receiving grease from the container or reservoir 20 as through the conduit 26, and with an oppositely disposed outlet (not shown) for supplying grease or other lubricant to the conduit 142.

Different bearings or other lubrication parts may require different amounts of lubricant. To provide a different distributor or pumping unit for every possible amount of lubricant that might be required from each piston and cylinder would necessitate enormous manufacturing and distributing establishments. Accordingly, in a preferred form of my invention I have provided replaceable piston and sleeve or cylinder units. As shown in Fig. 11 the casing 124c may remain substantially the same as previously disclosed, while the cam 152c and all other parts not mentioned remain the same as previously disclosed.

A sleeve 196 is threaded into each of a plurality of radial bores 198 corresponding to the cylinders mounting the pistons 120. The inner ends of the sleeves are spun over as at 200 to retain pistons 120c therein against the force of springs 148c compressed between the sleeve ends 209 and stops 202 on the reduced piston rods 204.

The sleeves 196 are provided with non-circular, nut-like outer ends 206 for threading the sleeves in or out, and are internally threaded for receipt of conduits 156c. Ball check valves 154c in the form of standard, commercially available units are suitably fixed in the sleeves adjacent the conduits. A lateral aperture 208 in each sleeve connects with the manifold 138c which receives grease from the reservoir in the manner previously taught. Piston and sleeve units having different sleeve wall thicknesses, and consequently different piston and internal sleeve diameter, may be screwed into the bores 198 for controlling the amount of grease or other lubricant to be ejected by each piston. The inner ends of the piston connecting rods bear on the cam 152c for reciprocation of the pistons as in the various forms of the invention heretofore described.

In general, it is preferable to supply too much lubricant to a bearing or the like rather than too little. However, certain types of bearing seals may be damaged if too much lubricant is supplied. To provide for that contingency, I have provided a by-pass that may be used in some installations. Referring to Fig. 12, such an arrangement may be seen. In this figure, most of the parts are identical with those heretofore shown and described and similar numerals, with the addition of the suffix "d" are used to obviate the necessity of repetitive description. The addition comprises a T fitting 210 mounted in one or more of the conduits 156d and provide with a pressure release valve 212. The pressure release valve leads to a by-pass conduit 214 returning to the manifold 138d through a check valve 216. If too much grease is supplied, pressure in the conduit 156d builds up and the valves 212 and 216 open to return excess grease to the manifold 138d.

From the foregoing description, it will be seen that the present invention provides an improved lubricant distributing system which is particularly adapted for use with automotive equipment where several parts should be periodically lubricated. The pumping means for forcing the lubricant to the ultimate points of distribution is of the positive displacement type and is pressured throughout positively to exclude air and to facilitate convenient relative positioning of the component parts. Each point to be lubricated is supplied with its lubricant from a separate pumping device, the capacity of which is readily variable, so as to assure positive supply of a proper amount of lubricant thereto.

While certain forms of the invention have been shown and described for purposes of illustration, it is to be clearly understood that various changes in the details of construction and arrangement of parts may be made without departing from the scope of the invention as set forth in the appended claims.

I claim:

1. A lubrication system comprising a storage container for lubricant, power operated means for pressurizing and distributing lubricant under pressure to a plurality of stations, and means for conveying lubricant from said container to said lubricant distributing means, said lubricant distributing means including a plurality of like units stacked together with complementary parts operatively interconnecting said units, and each of said units including a plurality of cylinders and pistons, and power means for actuating the pistons in turn individually to pressurize and supply lubricant under pressure to distributing conduits.

2. A lubrication system as set forth in claim 1 and further including a pumping unit stacked with the distributing units and having a complementary part operatively connecting said pumping unit to said distributing units.

3. A lubrication system as set forth in claim 2 wherein the pumping unit comprises a gear pump.

4. A lubrication system comprising a plurality of lubricant distributing units, each of said units comprising a body having complementary portions at substantially opposite ends thereof adapted to stack with similar units, the complementary portions engaging one another when so stacked, shaft means rotatably mounted in each body and extending substantially from end to end thereof, said shaft means having complementary sections at opposite ends thereof and the shaft means of adjacent stacked units being interconnected with one another, a plurality of piston means reciprocably mounted in each of said bodies for distributing lubricant therefrom, and means for reciprocating said piston means in response to rotation of said shaft means, a plurality of said units being held in stacked relation with the complementary portions of adjacent units engaging one another.

5. A lubrication system comprising a plurality of distributing units stacked together with a pumping unit, each distributing unit comprising a body having complementary portions at substantially opposite ends thereof, the complementary portions of adjacent distributing units engaging one another, shaft means rotatably mounted in each of said bodies and extending substantially from end to end thereof, the shaft means having complementary sections at opposite ends thereof and the shaft means of adjacent distributing units being drivingly interconnected, a plurality of piston means reciprocably mounted in each of said bodies for discharging lubricant therefrom, means for reciprocating all of said piston means in response to rotation of said shaft means, said pumping unit including a body with a portion complementary to and engaging one of the complementary end portions of a distributing unit body and further having shaft means having a section complementary to and drivingly interconnected with a complementary shaft means of one of the distributing units, a plurality of said distributing units and one of said pumping units in stacked relation being held in stacked relation.

6. A lubricant distributing system as set forth in claim 5 wherein the pumping unit comprises a gear pump.

7. A lubricant distributor comprising a body having a plurality of openings therein, shaft means rotatably mounted in said body, cam means on said shaft, a plurality of pumping units each embedded in one of said openings, and means for detachably retaining said pumping units embedded in said openings, each of said pumping units including a cylinder having a wall of predetermined thickness, each of said walls being substantially entirely surrounded and embraced by said body, lubricant inlet and outlet means in said cylinder, a piston reciprocably mounted in said cylinder and having a piston rod extending therefrom, means for retaining said piston in said cylinder, and means on said piston rod for effecting reciprocation of each rod and piston in response to rotation of said cam means.

8. A lubricant distributor as set forth in claim 7 wherein the means on the piston rod comprises a spring biasing the end of the rod against said cam means.

9. A lubricant distributor as set forth in claim 7 wherein the means for detachably retaining the pumping units in the openings includes complementary screw threads in the openings and on the cylinders.

References Cited in the file of this patent

UNITED STATES PATENTS

| | | |
|---|---|---|
| 1,487,568 | Howell | Mar. 18, 1924 |
| 1,716,252 | Voll | June 4, 1929 |
| 1,773,312 | Leufstadius | Aug. 19, 1930 |
| 1,900,745 | Sutter | Mar. 7, 1933 |
| 1,989,451 | Hull | Jan. 29, 1935 |
| 2,312,304 | Anderson | Mar. 2, 1943 |
| 2,515,900 | Schulhoff | July 18, 1950 |

FOREIGN PATENTS

| | | |
|---|---|---|
| 465,307 | Great Britain | May 5, 1937 |
| 501,998 | Great Britain | May 10, 1938 |
| 628,481 | Great Britain | Aug. 30, 1949 |
| 664,781 | Great Britain | Jan. 9, 1952 |
| 815,778 | France | July 22, 1937 |